United States Patent
Cantor et al.

[19]

[11] Patent Number: 6,155,601
[45] Date of Patent: Dec. 5, 2000

[54] SEAT-MOUNTED OCCUPANT CRASH PROTECTION SYSTEM

[75] Inventors: Alan Everett Cantor, Ivyland; Louis Anthony D'Aulerio, Horsham, both of Pa.; Leon P. Domzalski, Mount Laurel, N.J.; Bruce Peter Holmberg, Rockville, Md.; Michael Leonid Markushewski, Huntingdon Valley, Pa.; Larry Andrew Sicher, Quakertown, Pa.; Gary Robert Whitman, Jamison, Pa.; John Richard Yannaccone, Perkasie, Pa.

[73] Assignee: ARCCA Incorporated, Penns Park, Pa.

[21] Appl. No.: 09/303,303

[22] Filed: Apr. 30, 1999

[51] Int. Cl.⁷ ................................................. B60R 22/00
[52] U.S. Cl. ............................................................ 280/806
[58] Field of Search ............................................. 280/806

[56] References Cited

U.S. PATENT DOCUMENTS

| | | | |
|---|---|---|---|
| 5,423,598 | 6/1995 | Lane, Jr. et al. | 280/806 |
| 5,492,368 | 2/1996 | Pywell et al. | 280/806 |
| 5,553,924 | 9/1996 | Cantor et al. | 297/452.27 |
| 5,571,253 | 11/1996 | Blackburn et al. | 280/806 |
| 5,634,664 | 6/1997 | Seki et al. | 280/806 |
| 5,676,398 | 10/1997 | Nurtsch | 280/806 |

*Primary Examiner*—Kenneth R. Rice
*Attorney, Agent, or Firm*—Gifford, Krass, Groh, Sprinkle, Anderson & Citkowski, P.C.

[57] ABSTRACT

A vehicle seat assembly for protecting an occupant of a vehicle from injury includes a seat assembly having a seat back and a seat bottom, a pair of side bolsters disposed on each side of the seat back, a combined seat/lap belt and shoulder belt restraint which is affixed directly to the seat assembly, and a secondary shoulder restraint affixed to the seat assembly. The seat bottom includes a front portion and a ramp upwardly sloped towards the front portion of the seat bottom. A cushion constructed of a rate sensitive compression material having a compressive response to a slow application of force and a rigid response to a rapid application of force is disposed adjacent to the seat ramp. Pretensioning devices are operatively connected to both the combined seat/lap belt and shoulder belt restraint and to the supplemental shoulder belt restraint and are adapted to activate in response to a signal from a crash sensor to remove slack from the combined seat/lap belt and shoulder belt restraint and/or the supplemental shoulder belt restraint.

14 Claims, 1 Drawing Sheet

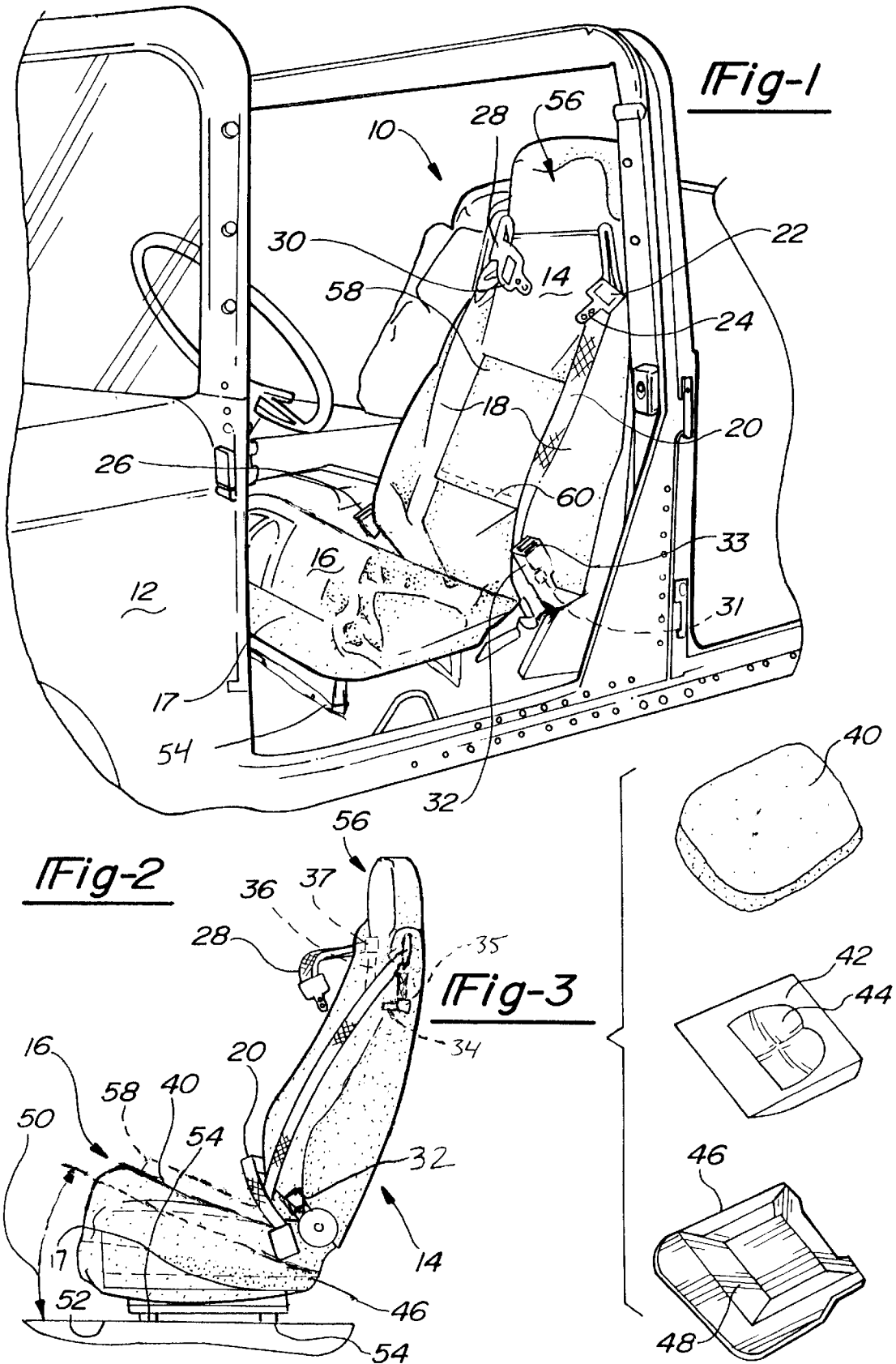

[6,155,601]

SEAT-MOUNTED OCCUPANT CRASH PROTECTION SYSTEM

TECHNICAL FIELD

The subject invention generally relates to vehicle safety equipment and, in particular, to a seat and restraint assembly for protecting the occupants of a vehicle from injury during a crash.

BACKGROUND OF THE INVENTION

The purpose of occupant restraint systems in motor vehicles is for the protection of occupants and to increase their survivability during crash impact of their vehicles. Research and analysis, such as that summarized by Martin Eiband, has identified the acceleration levels adult humans can survive. Eiband was a NASA researcher who published in 1959 a NASA Memorandum entitled "Human Tolerance to Rapidly Applied Accelerations: A Summary of the Literature." The U.S. military commonly uses Eiband data to assess injury survivability levels. Restrained motor vehicle occupants are frequently seriously or fatally injured in crashes that do not exceed these injury tolerance levels. This is usually due to body contact with the interior of the vehicle, vehicle structural intrusion into the occupant space, or non-optimal restraint system loading by the occupant. The subject invention counters these injury mechanisms so that the limiting crash survival factors are human tolerance to acceleration and vehicle intrusion. Occupant restraint systems generally perform three basic functions in order to achieve this purpose: the prevention of occupant ejection from the vehicle, the prevention or minimization of the effects of secondary collisions such as impacts of the occupant with interior vehicular structures, and the control of the crash forces applied to the occupant. Known occupant restraint devices such as three-point lap and shoulder harnesses which perform these functions have been widely researched and improved over the years, thereby significantly increasing automotive safety.

Today, occupant restraint systems in automobiles which typically incorporate the three-point lap and shoulder harness have inherent drawbacks. A properly designed system of this type provides reasonably effective restraint in frontal crashes. Furthermore, when the three-point lap and shoulder harness is coupled with a well-designed seat with sufficient seat back strength, adequate seat back height, and effective geometry, they will also provide adequate occupant protection for rear impact collisions or crashes. However, in crashes having significant lateral and/or vertical components, the effectiveness of the traditional three-point lap and shoulder harness alone significantly diminishes. The diminishment of the protection is especially true if the anchor points of the lap and shoulder harness are mounted to the vehicle rather than to the seat itself or if the principal direction of the force of the crash moves the occupant away from the shoulder harness. A lap/shoulder restraint system does not compensate for this.

Most automobile restraint systems in use today anchor the seat belt system directly to the vehicle structure. This creates a problem with front occupant positions where the seats can be adjusted longitudinally, vertically, and also recline.

These adjustments can result in seat positions that degrade the performance of the three-point lap and shoulder belt harness system. Extensive research has shown that proper anchor location, relative to the occupant, is critical for the optimum performance of the restraint system. Additionally, the design of the seat itself also plays a major role in effectively restraining the occupant. This consideration becomes even more important in vehicles subjected to off-road use such as sport utility vehicles (SUVs), utility vehicles, military vehicles, certain law enforcement vehicles, etc. In these types of vehicles, it is not only important to keep the occupant properly protected during a crash, but to also effectively restrain the occupant when the vehicle is utilized in terrain where, unless the occupant is well restrained to the vehicle through the use of an adequate seat assembly and restraint system, the occupant/driver may easily lose control of the vehicle.

In addition to the safety drawbacks described above, the prior art seating systems which utilize anchoring of the restraint systems to the vehicle itself also imparts economic and logistic drawbacks to the system design in that the entire seating platform becomes more difficult and, perhaps, more expensive to integrate into a variety of vehicles since the anchoring points for the restraints must be individually tailored to the vehicle. Accordingly, it would be desirable and advantageous to have an occupant restraint system which is self-contained on the seating platform which simplifies the integration of the restraint system into a variety of vehicles. Furthermore, it would be advantageous and desirable to have a vehicle safety seat system which effectively overcomes the drawbacks discussed above for typical three-point lap and shoulder harness restraint systems.

Summary of the Invention A vehicle seat assembly for protecting an occupant of a vehicle from injury includes a seat assembly having a seat back and a seat bottom, a pair of side bolsters disposed on each side of the seat back, a combined seat/lap belt and shoulder belt restraint which is affixed directly to the seat assembly, and a secondary shoulder restraint affixed to the seat assembly. The seat bottom includes a front portion and a ramp upwardly sloped towards the front portion of the seat bottom. A cushion constructed of a rate sensitive compression material having a compressive response to a slow application of force and a rigid response to a rapid application of force is disposed adjacent to the seat ramp. Pretensioning devices are operatively connected to both the combined seat/lap belt and shoulder belt restraint and to the supplemental shoulder belt restraint and are adapted to activate in response to a signal from a crash sensor to remove slack from the combined seat/lap belt and shoulder belt restraint and/or the supplemental shoulder belt restraint in all crashes with significant severity.

BRIEF DESCRIPTION OF THE DRAWINGS

FIG. 1 is a perspective view of the interior of a vehicle showing a seat assembly of the subject invention;

FIG. 2 is a side view of the seat assembly of the subject invention; and

FIG. 3 is an exploded perspective view of a seat bottom of the seat assembly of the subject invention.

DETAILED DESCRIPTION OF THE INVENTION

Referring to the Figures, wherein like numerals indicate like or corresponding parts throughout the several views, a vehicle safety seat assembly is generally shown at 10. The seat assembly 10 is to be installed as a unit into a vehicle 12 in either a front or rear seat location. The seat assembly 10 includes a seat back 14 and a seat bottom 16 which are attached to one another. The seat back 14 and the seat bottom 16 may be pivotally attached to one another at an end opposite the front 17 of the seat bottom 16.

A bolster 18 is disposed on each side of the seat back 14 to provide passive lateral support to the occupant. The bolsters 18 are designed to supplement the lateral restraint provided by a combined seat/lap and shoulder restraint assembly 20 and supplemental shoulder belt 28 by reducing the excursion of the occupant from the seat in collisions where the principal direction of force is directed from the sides of the occupant of the seat assembly 10. The bolsters 18 are preferably an integral component of the seat back 14 and are typically constructed by disposing a resilient material, such as foam rubber, over a rigid metal or polymeric frame as is well known in the art.

The seat assembly 10 includes a conventional seat or lap/shoulder belt restraint 20 which is connected to a pretensioner device 34 preferably disposed within the seat back 14. The lap/shoulder belt restraint generally comprises a woven webbing material. The lap portion of the lap/shoulder belt harness 20 is attached to the seat assembly 10 near the union of the seat back 14 and the seat bottom 16. This location assists in the control of the angulation of the buttocks of the occupant during unloading events during a crash. Attachment of the lap portion of the combined lap/shoulder belt restraint in this manner also improves the occupant crash protection during the roof impact portion of a vehicle rollover by minimizing occupant travel towards the roof of the vehicle 12. The lap/shoulder belt restraint 20 is preferably stowed in a retractor/spool assembly 35 mounted to one side of the seat back 14 preferably at shoulder level. The other end of the lap/shoulder belt restraint 20 is anchored to the side of the seat bottom 16 near the intersection of the seat back 14 and the seat bottom 16 and on the same side of the seat assembly 10 as the lap/shoulder belt restraint retractor 35. The combined lap/shoulder belt restraint 20 includes a cinching latchplate 22 attached to the webbing of the combined lap/shoulder belt restraint 20 and allows the latchplate 22 to slide along the webbing to provide for adjustment of the length of the lap/shoulder belt restraint 20. A metal tongue portion 24 of the latchplate 22 is received within a buckle receptacle 26 located on the opposite side of the seat bottom 16 near the intersection of the seat back 14 and the seat bottom 16. The cinching latchplate 22 maintains the tension of the combined lap/shoulder belt restraint 20 tightly against the occupant of the seat assembly 10 and prevents slack from the shoulder belt portion of the combined lap/shoulder belt restraint 20 from causing the lap portion of the harness 20 to become slack during a crash. This slack would degrade the pelvic restraint provided by the lap belt portion of the lap/shoulder belt restraint 20. Additionally, while the cinching latchplate 22 helps maintain tension and prevents the lap portion from becoming slack, it also allows the pretensioner 34 to further tighten the lap portion of the lap/shoulder belt restraint 20 through the cinching latchplate 22.

The supplemental shoulder belt restraint 28 is preferably disposed in a retractor/spool assembly 37 disposed on the side of the seat back 14 opposite the retractor 35 for the combined lap/shoulder belt restraint 20. A latchplate 30 is affixed to a free end of the supplemental shoulder belt restraint 28 by well known techniques including stitching or sewing. The latchplate 30 is received and retained in a buckle 32 disposed on the side of the seat bottom 16 opposite the side of the seat back 14 in which the supplemental shoulder belt restraint 28 is disposed. The buckle 32 is also preferably disposed near the intersection of the seat bottom 16 and the seat back 14. The buckle 32 incorporates an internal lock that maintains a latch pawl (not shown) against the inserted latchplate 30. The latch pawl prevents the movement and possible disengagement of the latchplate 30 from inertial loads applied to the latch pawl when the buckle 32 is accelerated in a crash. The buckle 32 also incorporates a shield about a push button release 33 to prevent inadvertent depression of the button 33 and release of the latchplate 30.

Anchoring the restraints 20, 28 to the seat assembly 10 rather than to the vehicle 12 structure maintains the optimum geometry in the restraint harnesses 20, 28 regardless of the seat assembly 10 position. This also helps to optimize the fit of the restraints 20, 28 to accommodate the full range of occupant sizes. Preferably, the anchor locations are disposed to provide symmetry to the occupant in the fore and aft plane.

The use of both the combined lap/shoulder belt restraint 20 and the supplemental shoulder belt restraint 28 improves the restraint effectiveness in all crash modes. It reduces body excursion for all crashes and distributes the restraint loads over a wider area of the occupant's body, thus decreasing the potential for injury from any part of the restraint. The design also permits the occupant to wear the familiar lap/shoulder belt restraint 20 and also provides vastly improved occupant protection with the addition of the supplemental shoulder belt restraint 28. Research into occupant compliance has demonstrated, however, that an occupant may be inclined to use only the supplemental shoulder belt restraint 28 alone rather than in combination with the lap/shoulder belt restraint 20. Accordingly, the present invention incorporates a "lock-out" to prevent the occupant from engaging the supplemental shoulder belt restraint 28 until they engage the lap/shoulder belt restraint 20. By engagement, it is meant that the supplemental shoulder belt restraint 28 cannot be utilized until the lap/shoulder belt restraint 20 is fastened or buckled to the buckle 26. The system 10 incorporates a lock-out feature that prevents the supplemental shoulder belt restraint 28 from being pulled from the retractor 37 and buckled without first attaching the lap/shoulder belt restraint 20. A small solenoid device 39 (not shown) located in the shoulder belt retractor/spool assembly 37 locks the spool 37. When the occupant buckles the lap/shoulder belt restraint 20, a signal is generated causing the solenoid 39 to retract and allow the supplemental shoulder belt retractor/spool 37 to operate normally. The supplemental shoulder belt retractor/spool 37 will operate normally until the lap/shoulder belt restraint 20 is unbuckled. After the lap/shoulder belt restraint 20 is unbuckled, the supplemental shoulder belt retractor/spool 37 will only allow the webbing of the supplemental shoulder belt restraint 28 to retract. A switch 31 disposed in the buckle 32 for the lap/shoulder belt restraint 20 controls the solenoid. The switch 31 is closed when the latchplate 30 for the lap/shoulder belt restraint 20 is inserted into the buckle 32. This activates the solenoid 39, unlocking the retractor/spool assembly 37 for the supplemental shoulder belt restraint 28. This allows the supplemental shoulder belt restraint 28 to be extracted from the retractor/spool assembly 37 and buckled.

The pretensioner devices 34, 36 each tighten either the combined lap/shoulder belt restraint 20 and/or the supplemental shoulder belt restraint 28, respectively, in the event of a crash. The pretensioner devices 34, 36 are typically pyrotechnic devices which, upon receipt of a signal from a crash sensor, cause the retractors 35, 37, respectively, to retract the webbing which comprises both the combined lap/shoulder belt restraint 20 and the supplemental shoulder belt restraint 28 to remove any slack in either of the combined lap/shoulder belt restraint 20 and/or the supplemental shoulder belt restraint 28 to place these elements under tension. The pretensioning of the restraints 20, 28 ensures that the occupant loads the lap/shoulder belt restraint 20 and supplemental shoulder belt restraint 28 earlier in a crash situation and, therefore, begin to decelerate earlier with the vehicle thus minimizing the acceleration and the loads applied to the occupant of the seat assembly 10. The pretensioners 34,36 have their own secondary locking mechanism that provides a backup to the primary locking device on the retractor/spool assemblies 35,37. As is well known in the art, when the pretensioners 34,36 are initiated, a small pyrotechnic fires, pulling a cable attached to the retractor/spool assemblies 35,37. This rotates the spool in the direction that retracts webbing of the belts 20,28 onto the spool and tightens the belts 20,28. As the spool turns, spring loaded pawls engage teeth on a retractor/spool axle. The pretensioner cable remains taut by a latch or cable clamp that prevents the cable from moving in the opposite direction. This mechanism ensures that the pawls of the secondary locking device permanently remain engaged. The seat belts 20,28 remain locked throughout the entire crash sequence including multiple impacts, rollovers, and rebound. This method of pretensioning of the seat belts eliminates the potential for the retractor 35,37 to "skip lock" by providing a built-in backup to the primary locking system. "Skip lock" is a phenomenon that occurs when the lock bar for the retractor engages the tip of a sprocket tooth rather than its root as it is intended to do. When this failure occurs, the retractor fails to function properly, leaving slack in the restraint system and degrading occupant protection.

The seat bottom 16 of the seat assembly 10 incorporates a seat ramp and a rate dependent compressible material that controls the pelvic motion of the occupant during frontal crashes and vertical exposures where the force vector comes from the bottom of the seat assembly 10. By incorporating a seat ramp, the phenomenon known as submarining, which occurs when poor seat belt geometry allows the pelvis of the occupant to rotate under the lap belt during a frontal crash, can be substantially reduced if not eliminated. If submarining occurs, the occupant can sustain abdominal and lumbar spinal injuries from the lap belt loading the soft abdominal region instead of the structurally strong pelvis and the shoulder belt may impinge upon the neck of the occupant resulting in central nervous system injuries.

The seat assembly 10 of the present invention reduces or eliminates this effect by incorporating a ramp 48 into a structural seat pan 46 which can be formed of a structural material such as a metal or a polymer. An intermediate resilient layer 42 can be disposed adjacent to the seat pan 46 to provide support to the occupant. The intermediate resilient layer 42 can also include a contour 44 which is adapted to conform to the buttocks of a seat occupant. A rate sensitive cushion layer 40 is then disposed over the intermediate resilient layer 42. The rate sensitive cushion layer 40 is adapted to have a rate sensitive compression characteristic. The rate sensitive compression characteristic is such that it presents a compressive response to a slow application of force and a rigid response to a rapid application of force such as the force applied to the top rate sensitive cushion layer 40 during an impact.

The intermediate resilient layer 42 can be formed of a number of suitable materials including a moldable rigid foam which provides a firm and stable surface upon which the rate sensitive cushion layer 40 can be disposed. A suitable material for forming the intermediate layer 42 can include a rigidized foam of the polyurethane type.

In a preferred embodiment of the present invention, the ramped seat bottom 16 is disposed at an angle 50 relative to the floor 52 of the vehicle 12.

The rate sensitive cushion layer 40 can be disposed over a contoured seat bucket or the intermediate resilient layer 42 having the seat contour 44 disposed in such a manner that it insures that substantially all loading of the upward forces transmitted to the occupant of the seat assembly 10 is done by way of the rate sensitive cushion layer 40.

These foams protect the occupant from vertical loading by reducing dynamic amplification. Dynamic amplification occurs when a vehicle begins to rapidly decelerate or accelerate but the occupant's velocity remains unchanged for some time period thereafter. This delay in the occupant's deceleration develops a relative velocity between the occupant and the vehicle. When the occupant's body finally comes in contact with the vehicle, the relative velocity results in the occupant being rapidly accelerated to the same velocity as the vehicle. This acceleration is much greater than the acceleration applied to the vehicle. Had the occupant decelerated with the vehicle (i.e., remained coupled to the vehicle by an efficient seat and restraint system) the acceleration and the resultant forces applied to the occupant would not have been amplified. They are open celled polyurethane foams having a rate sensitive property providing them with high energy absorbing properties. They exhibit low compression set for their low rebound, highly damped properties. When the rate sensitive cushion layer 40 is formed of such a rate sensitive material, it retains the shape of a depressing object when it returns to its original height if it is deformed slowly. Additionally, it softens when exposed to body temperature for a period of time. Both of these characteristics cause it to conform closely to the shape of the occupant of the seat assembly 10. This conformability allows the rate sensitive cushion layer 40 to distribute the weight of the occupant and transmit force of an impact more evenly.

It will be understood by those skilled in the art that the rate sensitive cushion layer 40 can be formed of a foam having a variable modulus of elasticity. For example, the rate sensitive cushion layer 40 can be formed of a foam material wherein the variable modulus of elasticity is a dual modulus of elasticity.

Similar ramped seat designs which can be utilized in the present invention are disclosed in U.S. Pat. No. 5,553,924 to Cantor et al. which is hereby incorporated by reference.

The seat assembly 10 further includes supports 54 disposed underneath the seat bottom 16 for mounting the seat assembly 10 to the floor 52 of the vehicle 12. The supports 54 can include fore and aft seat adjusters which allow the seat assembly to be moved in the fore and aft plane.

The seat back 14 is designed to include an integral head restraint or headrest portion 56 to provide back support and head restraint for the occupant of the vehicle 12. The head restraint portion 56 of the seat back 14 is aligned and contoured to assure that the head restraint portion 56 is in close proximity to the occupant's head. This prevents the development of significant relative motion between the occupant's head and the head restraint portion 56. Additionally, the inherent height of the head restraint portion 56 and the structural strength of the seat back 14 also provide supplemental protection from roof crush intrusion.

Referring to FIGS. 1 and 2, the seat assembly 10 can also include a seat bottom elevating member 58 which can be disposed in a recess in the seat back 14. The seat bottom elevating member 58 is a deployable belt-positioning booster which is integrated into the lumbar section of the seat back 14 such that it can be rotated about an integral hinge 60 from a stowed position as shown in FIG. 1 to a deployed position as shown in FIG. 2 wherein the seat bottom elevating member 58 is disposed directly adjacent to and in contact with the seat bottom 16. In the extended position as shown in FIG. 2, the seat bottom elevating member 58 provides a platform for a child or small adult which allows the child or small adult to be properly positioned to receive the maximum protective benefits from the seat assembly 10. The seat bottom elevating member 58 can also incorporate a seat ramp similar to the seat bottom ramp described above to limit submarining of the occupant. The seat bottom elevating member 58 is preferably constructed of a rate sensitive or dependent urethane foam to limit the vertical displacement of the occupant during a crash that could result in submarining under the lap belt or dynamic amplification of accelerations and loads.

The pretensioners 34,36 are connected to a sensor or sensors that can detect frontal, lateral, rear, rollover and slam down crashes. The pretensioners 34,36 will be initiated in all of these crash modes when the acceleration is above a predetermined threshold and the belt is in use. The sensing system is activated when the latchplate 30 for the lap/shoulder belt restraint 20 is inserted and latched in its buckle. The sensing system and switch 31 in each buckle 32 control the firing circuit for each pretensioner 34,36. The switch 31 in the lap/should belt buckle 32 activates the sensing system and partially closes the firing circuit for the lap/shoulder belt restraint pretensioner 36. The switch 31 in the supplemental shoulder belt buckle partially closes the firing circuit for the supplemental shoulder belt pretensioner 36. Two conditions must be satisfied to fire the pretensioners 34,36. The pretensioner for each belt fires if (1) the belt's latchplate is latched in its buckle and (2) the sensing system is activated.

Still other embodiments of the present invention will be apparent to one of skill in the art in view of the drawings, discussion and description presented herein. It is the following claims, including all equivalents, which define the scope of the invention.

What is claimed is:

1. A vehicle seat assembly for protecting an occupant of a vehicle from injury, said assembly comprising, in combination:

a seat assembly comprising a seat back and a seat bottom, a pair of side bolsters disposed on each side of said seat back;

a combined seat belt and shoulder belt element for restraining an occupant in said seat assembly, said combined seat belt and shoulder belt assembly affixed to said seat assembly, a supplemental shoulder belt element for establishing a secondary path of restraint of the occupant, said supplemental shoulder belt assembly affixed to said seat assembly;

said seat bottom including a front portion and a seat ramp upwardly sloped toward said front portion of said seat bottom and a cushion constructed of a rate sensitive compression material having a compressive response to a slow application of force and a rigid response to a rapid application of force;

a first pretensioner device operatively connected to said combined seat belt and shoulder belt element, a second pretensioner device operatively connected to said supplemental shoulder belt element; and said pretensioner devices adapted to activate in response to a signal from a crash sensor to remove slack from the combined seat belt and shoulder belt element and the supplemental shoulder belt element.

2. A vehicle seat assembly according to claim 1, wherein said rate sensitive compression material comprises a resilient layer disposed adjacent to said seat ramp.

3. A vehicle seat assembly according to claim 1, wherein said seat back includes an integral head restraint.

4. A vehicle seat assembly according to claim 1, wherein said first pretensioner device is operatively connected to a retractor disposed in said seat assembly, said retractor operatively connected to said combined seat belt and shoulder belt element.

5. A vehicle seat assembly according to claim 1, wherein said second pretensioner device is operatively connected to a retractor, said retractor operatively disposed in said seat assembly connected to said supplemental shoulder belt element.

6. A vehicle safety seat system according to claim 1, wherein said first and second pretensioner devices include pyrotechnic devices.

7. A vehicle seat assembly according to claim 1, wherein said seat back includes a seat bottom elevating member movable from a first, stowed position wherein said elevating member is substantially disposed adjacent to said seat back and a second, extended position wherein said elevating member is disposed adjacent to said seat bottom thereby increasing the elevation of an occupant sitting on said elevating member.

8. A vehicle seat assembly according to claim 7, wherein said elevating member comprises a rate sensitive compression material.

9. A vehicle seat assembly according to claim 7, wherein said elevating element includes an integral hinge to allow said elevating element to be pivoted between said stowed position and said extended position.

10. A vehicle seat assembly according to claim 1, wherein said seat assembly includes a lock mechanism operatively connected to said supplemental shoulder belt element to prevent the use of said supplemental shoulder belt element without the use of said combined seat belt and shoulder belt element.

11. A vehicle seat assembly according to claim 1, wherein said seat assembly includes a bracket disposed under said seat bottom for attachment to a vehicle.

12. A vehicle seat assembly according to claim 11, wherein said bracket allows for fore and aft movement of said seat assembly with respect to said vehicle.

13. A vehicle seat assembly according to claim 7, wherein said elevating element includes a seat ramp.

14. A vehicle seat assembly according to claim 1, wherein each of said pretensioner devices is activated by a signal generated by said crash detector.

* * * * *